(12) United States Patent
Park et al.

(10) Patent No.: US 7,477,342 B2
(45) Date of Patent: Jan. 13, 2009

(54) LIQUID CRYSTAL DISPLAY DEVICE

(75) Inventors: June Ho Park, Kumi-shi (KR); Sai Chang Yun, Taogu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/696,440

(22) Filed: Oct. 28, 2003

(65) Prior Publication Data
US 2004/0239834 A1 Dec. 2, 2004

(30) Foreign Application Priority Data
Dec. 27, 2002 (KR) ................ 10-2002-0085285

(51) Int. Cl.
*G02F 1/1335* (2006.01)
(52) U.S. Cl. ............................ 349/96; 349/64; 349/117; 349/122
(58) Field of Classification Search .............. 349/96, 349/61, 64, 115, 117, 122, 175; 359/599
See application file for complete search history.

(56) References Cited

U.S. PATENT DOCUMENTS

| | | | | |
|---|---|---|---|---|
| 5,587,816 A | * | 12/1996 | Gunjima et al. | 349/62 |
| 6,124,905 A | * | 9/2000 | Iijima | 349/62 |
| 6,177,153 B1 | * | 1/2001 | Uchiyama et al. | 428/1.1 |
| 6,339,501 B1 | * | 1/2002 | Kameyama et al. | 359/485 |
| 6,542,300 B2 | * | 4/2003 | Umemoto | 359/491 |
| 6,573,961 B2 | * | 6/2003 | Jiang et al. | 349/115 |
| 6,683,717 B1 | * | 1/2004 | Miyatake et al. | 359/490 |

FOREIGN PATENT DOCUMENTS

KR     2004 0031858      4/2004

OTHER PUBLICATIONS

Korean Office Action from Corresponding Korean Patent Application No. 9-5-2004-049257568.

* cited by examiner

*Primary Examiner*—Dung Nguyen
*Assistant Examiner*—Tai Duong
(74) *Attorney, Agent, or Firm*—Brinks Hofer Gilson & Lione

(57) ABSTRACT

An LCD device includes lower and upper substrates facing each other, a liquid crystal layer between the lower and upper substrates, a first polarizing plate on the upper substrate, a second polarizing plate below the lower substrate, and a backlight unit below the second polarizing plate. The second polarizing plate has a light-diffusion layer that is proximate to the backlight unit. The light-diffusion layer has projections that project towards and contact the backlight unit. These projections are smooth curves that do not damage the surface of the backlight unit. The total of the Haze formed by the first and second polarizing plates is at least 40%.

12 Claims, 4 Drawing Sheets

LIQUID CRYSTAL DISPLAY DEVICE

BACKGROUND OF THE INVENTION

1. Field of the Invention

The present invention relates to a liquid crystal display (LCD) device, and more particularly, an LCD device having a polarizing plate for improving luminance and preventing backlight Mura phenomenon.

2. Discussion of the Related Art

With development of the present information society, the demand for various display devices has increased dramatically quite recently. Accordingly, much effort has been expended to research and develop various flat display devices, such as liquid crystal display (LCD), plasma display panel (PDP), electroluminescent display (ELD), and vacuum fluorescent display (VFD) devices. Some of these flat display devices have already been used in displays of various devices.

Among the various flat display devices, the liquid crystal display (LCD) device has been most widely used due to its numerous advantages. LCD devices are thin, lightweight, and have a relatively low power consumption compared with the other types of displays, most notably Cathode Ray Tubes (CRT). This allows the LCD to substitute for the CRT in most devices. In addition to LCDs incorporated in mobile devices such as being used as a display for a notebook computer or personal data assistant (PDA), LCD devices have been developed for stationary electronic devices such as computer monitors and televisions to receive and display broadcasting signals.

Despite various technical developments in the LCD technology with applications in different fields, research in enhancing the picture quality of the LCD device has been in some respects lacking as compared to other features and advantages of the LCD device. In order to use the LCD device in various fields as a general display, the key to developing the LCD device lies on whether the LCD device can implement a high quality picture, such as high resolution and high luminance with a large-sized screen while still maintaining lightness in weight, thinness, and low power consumption.

The LCD device includes an LCD panel for displaying a picture image, and a driving part for applying a driving signal to the LCD panel. The LCD panel includes lower and upper glass substrates bonded to each other at a predetermined interval, and a liquid crystal layer injected between the lower and upper glass substrates. At this time, the liquid crystal layer is driven according to an electric field between the lower and upper substrates, thereby controlling light transmittance. As a result, the picture image is displayed on the LCD panel.

Hereinafter, a related art LCD device will be described with reference to the accompanying drawings. FIG. 1 is a cross-sectional view illustrating the related art LCD device. As shown in FIG. 1, a lower substrate 10 of the related art LCD device includes a plurality of pixel regions (not shown) in a matrix type, and a thin film transistor (not shown) and a pixel electrode 11 formed in each pixel region. Also, an upper substrate 1 includes a color filter layer 3 for displaying various colors, and a common electrode 5. Then, a liquid crystal layer 13 is formed between the lower and upper substrates 10 and 1. Subsequently, first and second polarizing plates 14a and 14b are respectively formed on the upper substrate 1 and under the lower substrate 10 for linearly polarizing visible light, and a backlight unit 15 is formed under the second polarizing plate 14b.

Although not shown, a plurality of gate lines are formed on the lower substrate (TFT array substrate) 10 at fixed intervals, and a plurality of data lines are formed perpendicular to the gate lines at fixed intervals, thereby defining the plurality of pixel regions. Then, the plurality of pixel electrodes 11 are respectively formed in the pixel regions as the matrix type, and the plurality of thin film transistors are switchable in response to signals of the respective gate lines for transmitting signals of the respective data lines to the respective pixel electrodes 11. After that, a first alignment layer 12 is formed to determine an alignment direction of liquid crystal. Also, the upper substrate (color filter substrate) 1 includes a black matrix layer 2 for excluding light from portions of the lower substrate except in the pixel regions, a Red/Green/Blue color filter layer 3 for displaying the various colors, the common electrode 5 on an entire surface of the upper substrate 1 for obtaining a picture image, and a second alignment layer 6 on the common electrode 5 for determining the alignment direction of the liquid crystal. An overcoat layer 4 protects the color filter layer 3 and flattens the upper substrate 1.

FIG. 2 is a cross-sectional view taken along line I-I of FIG. 1, which illustrates a cross-sectional structure of the second polarizing plate 14b. Referring to FIG. 2, the second polarizing plate 14b sequentially includes a first adhesive layer 20, a first passivation layer 21, a polarizer 22, a second passivation layer 23, a second adhesive layer 24, a λ/4 phase shift plate 25, a third adhesive layer 26, a Cholesteric Liquid Crystal (CLC) layer 27 and a third passivation layer 28. At this time, an upper surface of the first adhesive layer 20 is in contact to the lower substrate 10, and a lower surface of the third passivation layer 28 is in contact to the backlight unit 15. The first, second, and third passivation layers 21, 23 and 28 are formed of Tri-Acetyl-Cellulose (TAC).

In order to obtain the necessary thinness and lightness of an LCD module for a notebook PC in the LCD device having the aforementioned structure, a light-scattering means formed on a light-guiding plate of the backlight unit 15 is formed of three sheets. The light-scattering means receives the light emitted from the backlight, and uniformly scatters the received light to an entire surface of the LCD panel.

Generally, the light-scattering means is comprised of four sheets such as a lower light-diffusion plate, first and second prism sheets, and an upper light-diffusion plate. Recently, the light-scattering means using the three sheets, removing the upper light-diffusion plate to decrease the thickness of the LCD device. Thus, the light-scattering means is formed from a lower light-diffusion plate 15a and first and second prism sheets 15b. However, as compared to the light-scattering means using four sheets, the light-scattering means using only three sheets has problems with a backlight Mura phenomenon (referred to as Newton's Ring or Wet-Out). According to the backlight Mura phenomenon, rainbow-spots are generated on a screen when two glass substrates come in contact with each other, thereby generating spots on the screen during displaying of the picture image. As a result, the picture image is not smoothly displayed on the screen.

A key quality requirement for photomasks used in fabricating the display is the absence of Mura. Mura is caused by systematic deviations in the photomask and can be visible as stripes. Mura compromises the image quality of the finished display. Usually the deviations causing the Mura are very small, below a few hundred nanometers. While deviations of that size spread over a large area can be difficult to detect by measuring, the human eye can still see them due to its high sensitivity to systematic changes in gray scale. Laser repairs are often performed to correct such deviations, however, such repairs are difficult, time consuming, and costly as they require specialized equipment.

In order to solve the problem of the backlight Mura phenomenon in the related art LCD device as shown in FIG. 2, a diffusion process is performed on the polarizing plate by adding beads to the third adhesive layer 26 between the CLC layer 27 and the λ/4 phase shift plate 25. This diffusion process permits the backlight Mura phenomenon to be decreased. However, the luminance of the resulting LCD is smaller than that of an LCD having a polarizing plate in which the diffusion process is not performed. Also, if laser repair is to be performed, it is extremely difficult to focus on the layer of the LCD panel to be repaired when watching the lower substrate 10 under the microscope because of the large density of beads added to the third adhesive layer 26 for the diffusion process.

Specifically, one of polarizing plate characteristics, Haze, indicates the light-scattering intensity of transmitted light and reflected light. If the Haze value is small, brightness of the screen is greatly changed at portions such as the black matrix layer (i.e. the area excluding the light), so that it is hard to smoothly display the picture image. Meanwhile, if the Haze value is large, deterioration in the resolution ratio results. If the diffusion process is not performed on the polarizing plate, the Haze of the standard polarizing plate is about 0% and the luminance is about 30%. These values are such that the polarizing plate is susceptible to the backlight Mura phenomenon. However, if the conventional diffusion process is performed on the third adhesive layer, the Haze of the polarizing plate is about 80% and the luminance is only about 20%. While such a Haze prevents the backlight Mura phenomenon, this is an unacceptable decrease in luminance. In practicality, a Haze of at least 40% permits sufficient scattering to reduce the backlight Mura phenomenon to a negligible amount.

SUMMARY OF THE INVENTION

Accordingly, the present invention is directed to an LCD device having a polarizing plate that substantially obviates one or more problems due to limitations and disadvantages of the related art.

The present invention provides an LCD device having improved luminance and substantially preventing backlight Mura phenomenon.

Additional advantages and features of the invention will be set forth in part in the description which follows and in part will become apparent to those having ordinary skill in the art upon examination of the following or may be learned from practice of the invention. Other advantages of the invention may be realized and attained by the structure particularly pointed out in the written description and claims hereof as well as the appended drawings.

To achieve these and other advantages and in accordance with the invention, as embodied and broadly described herein, in one embodiment, a liquid crystal display polarizing plate comprises a light-diffusion layer on one surface. The liquid crystal display may have a sufficient amount of Haze to substantially eliminate backlight Mura phenomenon. The light-diffusion layer may have a surface including a plurality of projections. In this case, the projections may have round shapes and/or smooth curves.

In another embodiment, a polarizing plate for a liquid crystal display (LCD) device comprises a light-diffusion layer, a first passivation layer above the light-diffusion layer, a Cholesteric Liquid Crystal (CLC) layer on the first passivation layer, a first adhesive layer on the CLC layer, a λ/4 phase shift plate on the first adhesive layer, a second adhesive layer on the λ/4 phase shift plate, a second passivation layer on the second adhesive layer, a polarizer on the second passivation layer, a third passivation layer on the polarizer, and a third adhesive layer on the third passivation layer.

The light-diffusion layer may contact a surface of the first passivation layer. In this case, the light-diffusion layer may have a surface including a plurality of projections. These projections may have round shapes and/or smooth curves.

In another embodiment, a liquid crystal display (LCD) device comprises lower and upper substrates facing each other, a liquid crystal layer between the lower and upper substrates, a first polarizing plate on the upper substrate, a second polarizing plate below the lower substrate, the second polarizing plate having a light-diffusion layer therebelow, and a backlight unit below the second polarizing plate.

The second polarizing plate may comprise a first adhesive layer, a first passivation layer, a polarizer, a second passivation layer, a second adhesive layer, a λ/4 phase shift plate, a third adhesive layer, a Cholesteric Liquid Crystal (CLC) layer, a third passivation layer, and the light-diffusion layer in order of proximity to the lower substrate.

The light-diffusion layer may contact a surface of the third passivation layer. A plurality of projections may be formed on one surface of the light-diffusion layer. These projections may have round shapes and/or smooth curves. The adhesive layers may be devoid of added beads. The light-diffusion layer may produce an amount of Haze and a density of the projections may be less than a density of beads that would have to be added to one of the adhesive layers to obtain the same amount of Haze A total of Haze of the first polarizing plate and Haze of the second polarizing plate may be at least about 40%.

The backlight unit may comprise a light-scattering means. The light-scattering means may comprise a light-diffusion plate, a first prism sheet below the light-diffusion plate, and a second prism sheet below the first prism sheet.

The light-diffusion layer may be adjacent to and may further contact the backlight unit. If projections contact the backlight unit, the projections may have shapes that do not substantially damage the backlight unit.

In another embodiment, a method of fabricating a liquid crystal display (LCD) device comprises obtaining a first polarizing plate having a light-diffusion layer on a surface thereof and placing the polarizing plate between a lower substrate and a backlight unit of the LCD device.

The obtaining the first polarizing plate may comprise forming the first polarizing plate. The method may further comprise forming a plurality of projections on the surface of the first polarizing plate. These projections may have round shapes and/or smooth curves on the surface of the first polarizing plate.

The method may further comprise disposing a second polarizing plate more distal to the backlight unit than the lower substrate, wherein a total of Haze of the first polarizing plate and Haze of the second polarizing plate is at least about 40%.

The method may further comprise disposing the light-diffusion layer adjacent to the backlight unit. The light-diffusion layer may further contact the backlight unit.

The method may further comprise forming a passivation layer incorporating the light-diffusion layer.

The method may further comprise light-diffusion layer on a surface of a passivation layer of the first polarizing plate. In this case, the method may further comprise forming a plurality of projections on the surface of the passivation layer. These projections may have round shapes and/or smooth curves on the surface of the passivation layer. The method may also comprise disposing a second polarizing plate more distal to the backlight unit than the lower substrate, wherein a total of Haze of the first polarizing plate and Haze of the second polarizing plate is at least about 40%.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to different embodiments of the present invention, examples of which are illustrated in the accompanying drawings. Wherever possible, the same reference numbers will be used throughout the drawings to refer to the same or like parts.

Hereinafter, an LCD device according to one embodiment of the present invention will be described with reference to the accompanying drawings.

Figure 1:
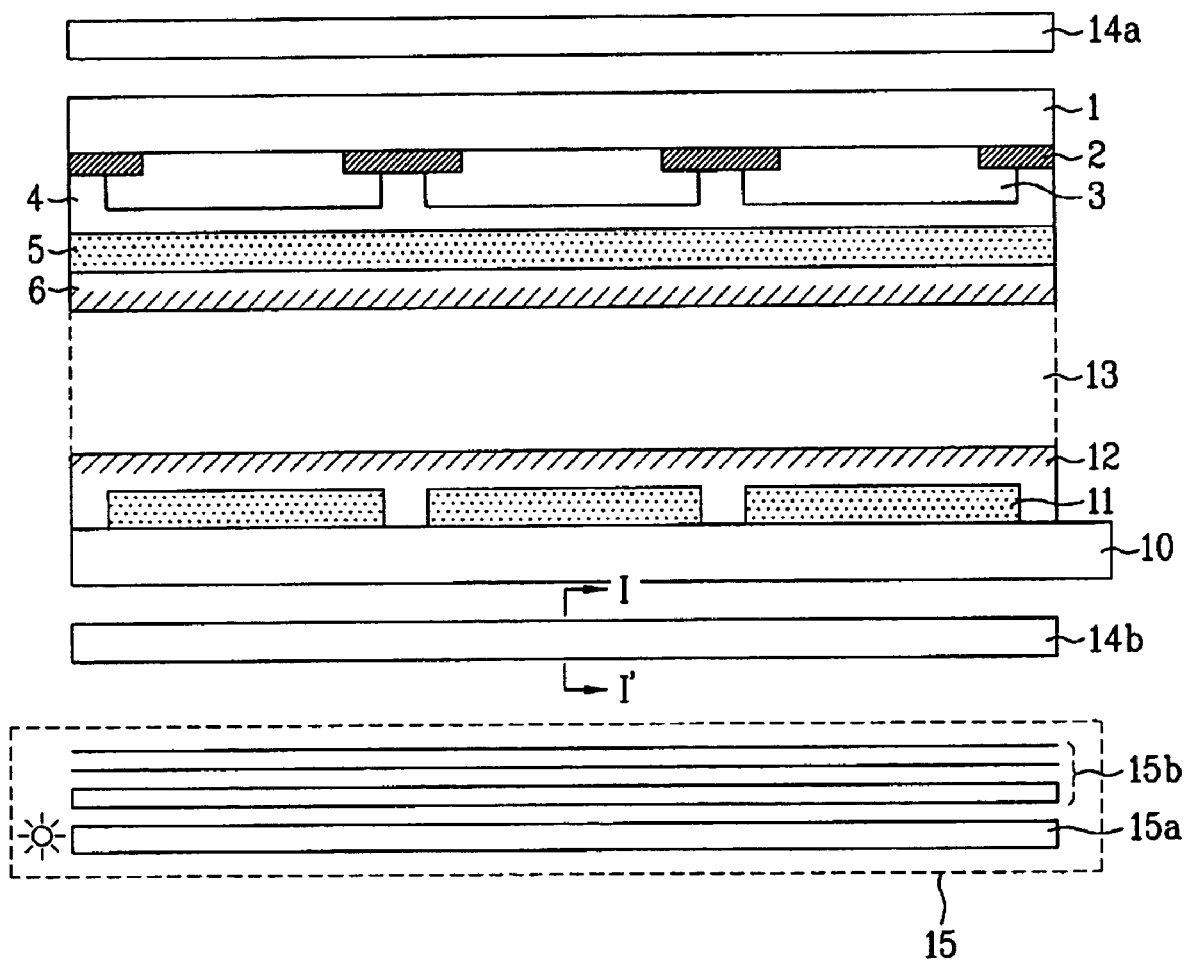
FIG. 1 is a cross-sectional view illustrating a related art LCD device.
Figure 2:
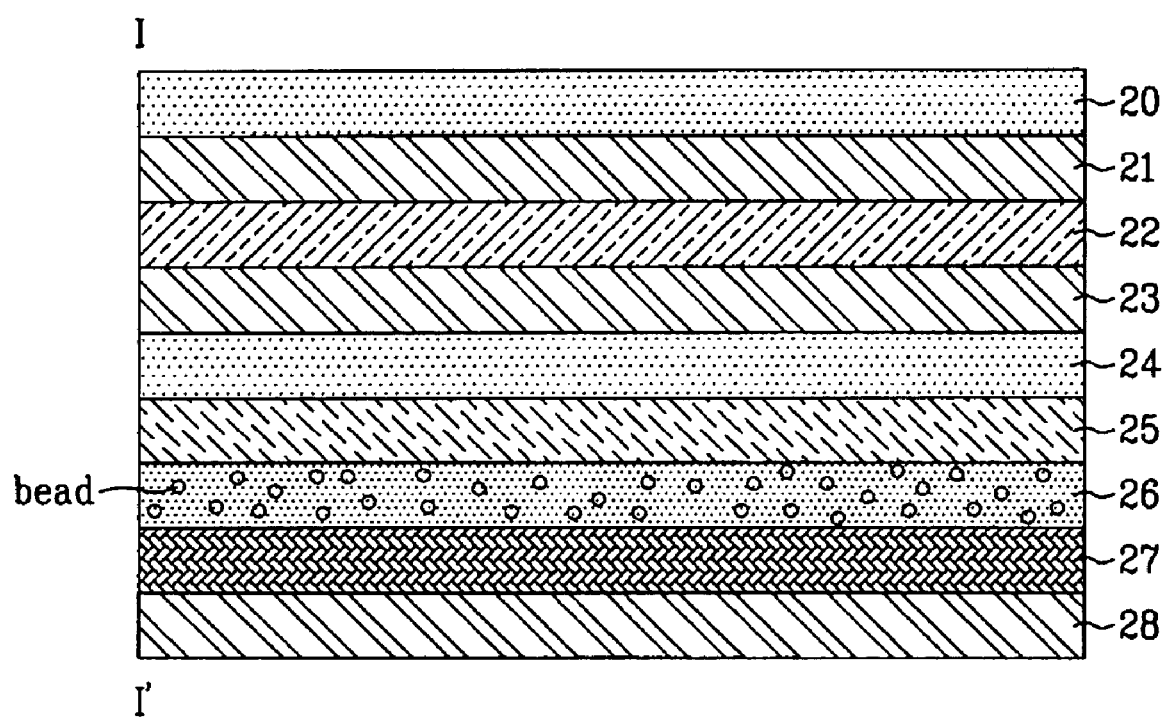
FIG. 2 is a cross-sectional view taken along line I-I of FIG. 1.
Figure 3:
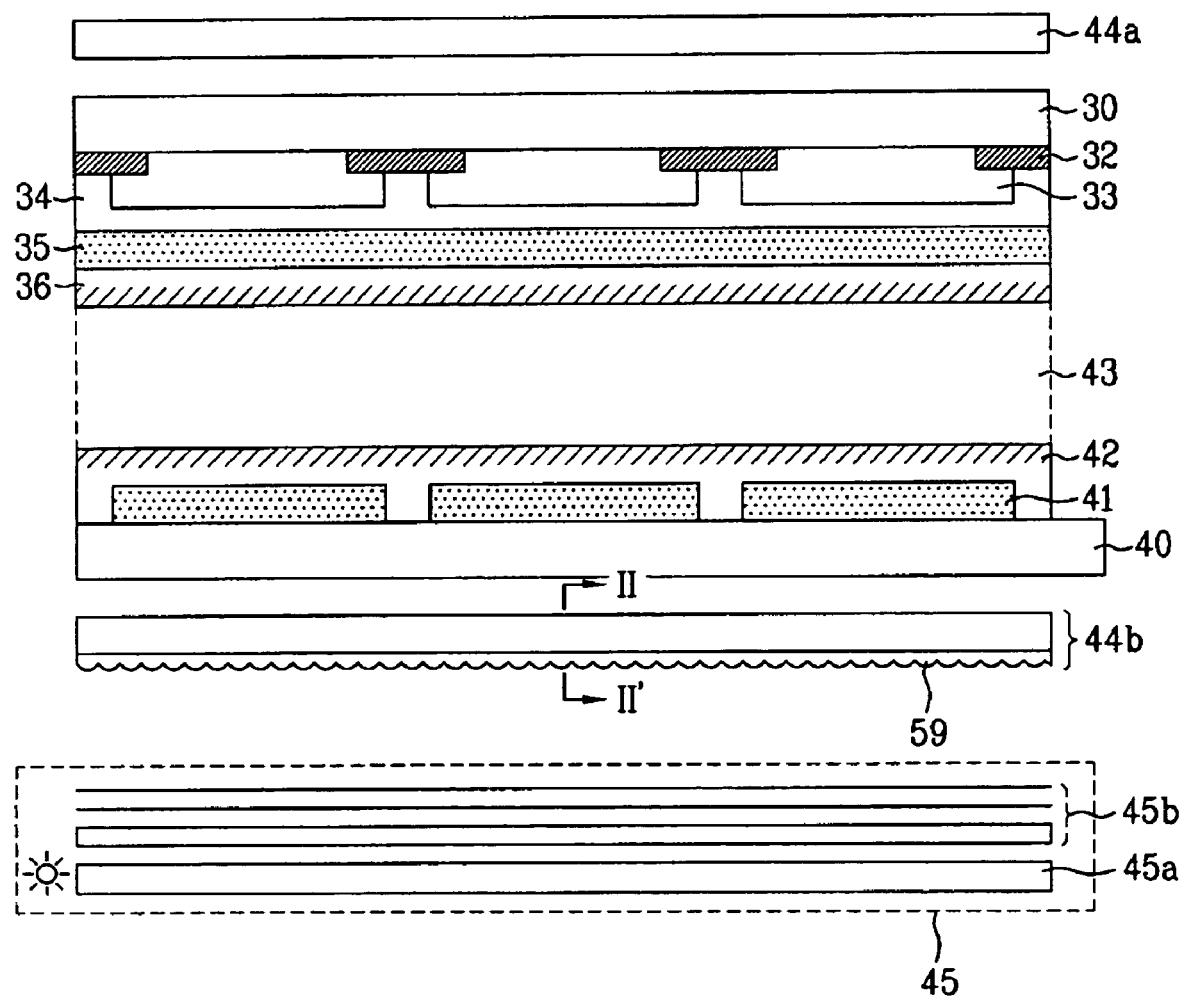
FIG. 3 is a cross-sectional view illustrating an LCD device according to an embodiment of the present invention.

FIG. 3 is a cross-sectional view illustrating an LCD device according to an embodiment of the present invention. As shown in FIG. 3, the LCD device includes a lower substrate 40, an upper substrate 30 and a liquid crystal layer 43. The terms upper and lower refer to the relative position between to a viewer of the LCD device, with the upper substrate 30 more proximate to the viewer than the lower substrate 40. The lower substrate 40 includes a plurality of pixel regions (not shown) formed in a matrix, and a thin film transistor (not shown) and a pixel electrode 41 formed in each pixel region. Also, the upper substrate 30 includes a color filter layer 33 for displaying various colors, and a common electrode 35, and the liquid crystal layer 43, which is formed between the lower and upper substrates 40 and 30. In addition, first and second polarizing plates 44a and 44b are respectively formed on the upper substrate 30 and under the lower substrate 40. The first and second polarizing plates 44a and 44b linearly polarize visible light, either from the backlight unit 45 and a light-diffusion layer 59 is formed below the second polarizing plate 44b. A backlight unit 45 is formed below the second polarizing plate 44b having the light-diffusion layer 59. The backlight unit 45 is a three-layer structure that comprises a lower light-diffusion plate 45a and first and second prism sheets 45b. As seen in FIG. 3, the light-diffusion layer 59 is formed on a surface of the second polarizing plate 44b most proximate to the backlight unit 45.

Although not shown, a plurality of gate lines are formed on the lower substrate (TFT array substrate) 40 at fixed intervals, and a plurality of data lines are formed perpendicular to the gate lines at fixed intervals, thereby defining the plurality of pixel regions. Then, the plurality of pixel electrodes 41 are respectively formed in the pixel regions in a matrix-type arrangement, and the plurality of thin film transistors are switched in response to signals of the respective gate lines for transmitting signals of the respective data lines to the respective pixel electrodes 41. Next, a first alignment layer 42 is formed to determine an alignment direction of liquid crystal. Also, the upper substrate (color filter substrate) 30 includes a black matrix layer 32 for excluding light from portions of the lower substrate except in the pixel regions, a Red/Green/Blue color filter layer 33 for displaying various colors, the common electrode 35 on an entire surface of the upper substrate 30 for obtaining a picture image, and a second alignment layer 36 on the common electrode 35 for determining the alignment direction of the liquid crystal. An overcoat layer 34 protects the color filter layer 33 and flattens the upper substrate 44a.

Figure 4:
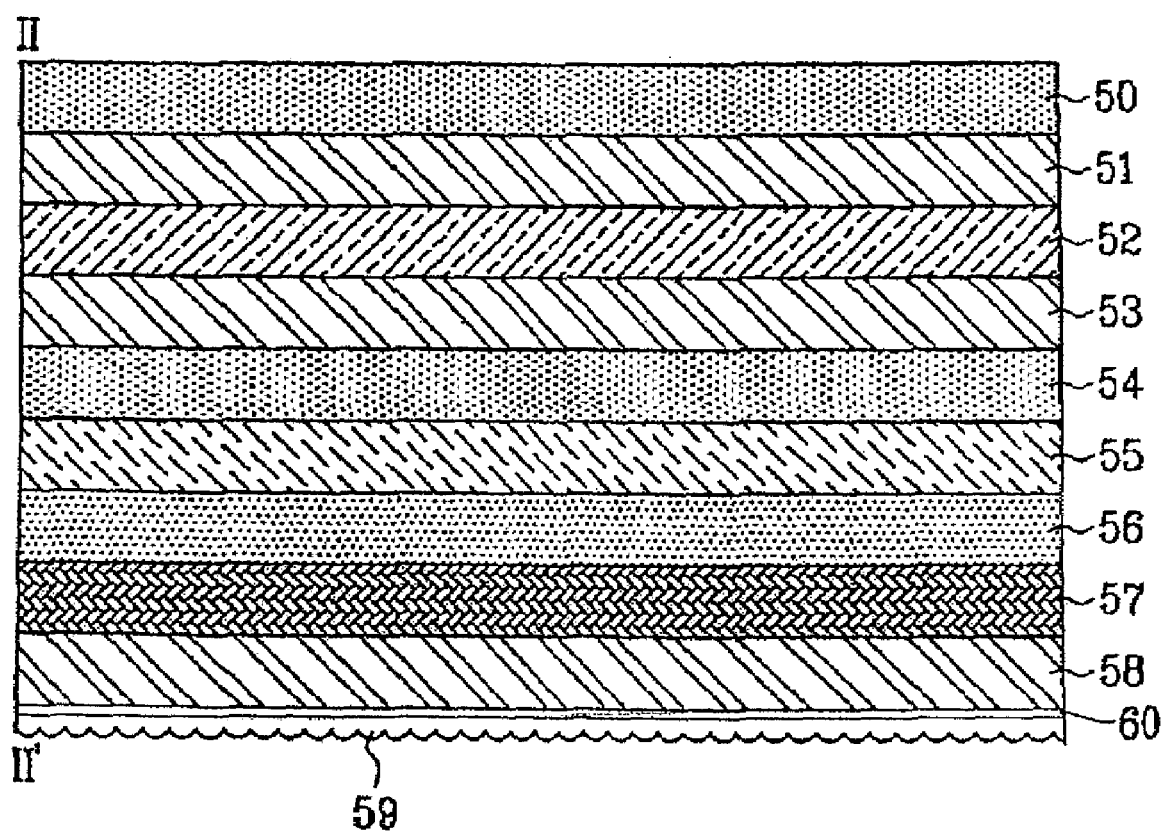
FIG. 4 is a cross-sectional view taken along line II-II of FIG. 3.

FIG. 4 is a cross-sectional view taken along line II-II of FIG. 3, which illustrates a cross-sectional structure of the second polarizing plate 44b. Referring to FIG. 4, the second polarizing plate 44b sequentially includes a first adhesive layer 50, a first passivation layer 51, a polarizer 52, a second passivation layer 53, a second adhesive layer 54, a λ/4 phase shift plate 55 for shifting a phase of an incident light, a third adhesive layer 56, a Cholesteric Liquid Crystal (CLC) layer 57, a third passivation layer 58 and a light-diffusion layer 59. At this time, an upper surface of the first adhesive layer 50 is in contact with the lower substrate 40, and a lower surface of the light-diffusion layer 59 is in contact with the backlight unit 45. The first, second, and third passivation layers 51, 53 and 58 are formed of Tri-Acetyl-Cellulose (TAC). Also, the first and second passivation layers 51 and 53 protect the polarizer 52, and the third passivation layer 58 protects the CLC layer 57. The polarizer 52 is formed of Poly-Vinyl-Alcohol (PVA), and the CLC layer 57 re-uses the light for improving light efficiency of the backlight unit 45. That is, the CLC layer 57 transmits one of right-circular and left-circular polarized light, and reflects the other, and then the CLC layer 57 transmits the light reflected by a reflecting plate (not shown) of the backlight unit 45. As a result, the light received from the backlight unit 45 is completely used.

The light-diffusion layer 59 is formed through the diffusion process by adding a diffusion enhancer such as $SiO_2$ particles, beads or other projections to a lower surface of the third passivation layer 58. The lower surface of the light-diffusion layer 59 thus has a surface that includes a plurality of projections. The projections are formed in round shapes having smooth curves that extend towards and at least some of which contact the backlight unit 45. These round shapes may be substantially formed from a segment of a sphere (e.g. hemispherical), although they may be ellipsoidal, parabolic, or quonset-shaped for example. The light-diffusion layer 59 may be formed by performing an Anti-Glare process on the third passivation layer 58. The projections may be formed directly on the third passivation layer 58 or on a relatively thin layer 60 (thin compared with the third passivation layer 58) that is separate from the third passivation layer 58. This relatively thin layer may be used to provide additional benefits to the structure without increasing the thickness by a substantial amount. The density of these projections is substantially less than that of the beads in the third adhesive layer 56 of the related art and thus has the commensurate advantages described herein. The amount of Haze produced by the light-diffusion layer 59 and that produced by an adhesive layer having beads may be the same even though the density of the projections is substantially less than the density of beads added to the adhesive layer. The light-diffusion layer 59 may also be coated with an anti-reflection coating to reduce the amount of light reflected by the projections.

As above, shapes other than hemispherical may be chosen to form the uneven surface of the light-diffusion layer 59. However, because the shapes may contact the light-diffusion layer 59, the uneven surface of the light-diffusion layer 59 may contain smooth curves to prevent the uppermost sheet (the sheet that is most proximate to the light-diffusion layer 59, as shown the second prism sheet of the sheets 45b) of the backlight unit 45 from being scratched or otherwise substantially damaged during fabrication of the individual device, installation into the LCD device into the electronics, or later usage of the electronics.

Moreover, the Haze of the LCD is to the total of the Haze of the first polarizing plate 44a adhering to the upper substrate 30 as well as the Haze of the second polarizing plate 44b. Thus, the Haze of both the first and second polarizing plates 44a and 44b respectively adhering to the upper and lower substrates 30 and 40 may be controlled. The combined Haze may be at least 40%, which provides a sufficient amount of Haze to substantially eliminate the background Mura phenomenon. For example, if the Haze of the first polarizing plate 44a is about 28%, it is possible to maintain control the Haze of the second polarizing plate 44b such that it is at least about 12% without substantially detrimentally affecting the luminescence of the LCD device. If the Haze of the first polarizing plate 44a is instead about 12%, it is possible to maintain the Haze of the second polarizing plate 44b such that it is at least about 28%.

In summary, a light-scattering means is formed on a light-guiding plate of the backlight unit which decreases the thickness and weight of an LCD module for a notebook PC or other electronics using the LCD device. The light-scattering means receives the light emitted from the backlight, and uniformly diffuses the received light to an entire surface of the LCD panel. The light-scattering means contains only three sheets: a light-diffusion plate, a first prism sheet, and a second prism sheet, thereby decreasing the thickness and weight of the LCD but correspondingly increases generation of the backlight Mura phenomenon compared with a light-scattering means using an additional light-diffusion plate. An Anti-Glare or similar process is performed on the surface of a third passivation layer of the polarizing plate to form a light-diffusion layer having a surface. This surface contains smooth curves, such as hemispheres, that are in contact with the backlight unit. Control of the density of these curves prevents the backlight Mura from being generated by increasing the Haze of the light-diffusion layer while simultaneously increasing luminescence of the LCD as compared with conventional polarizers in which the light-scattering means is contained within the adhesive layer closest to the backlight. In addition, because of the lower density of the light diffusing projections, viewing inhomogeneities in the structure using a microscope or other similar visual inspection device is easier, thereby improving laser repair characteristics of the LCD.

It will be apparent to those skilled in the art that various modifications and variations can be made in the present invention. For example, a combination of the light-diffusion layer on the surface of the polarizing plate and beads in the adhesive may be used. Thus, it is intended that the present invention covers the modifications and variations of this invention provided they come within the scope of the appended claims and their equivalents.

What is claimed is:

1. A liquid crystal display (LCD) device comprising:
lower and upper substrates facing each other;
a liquid crystal layer between the lower and upper substrates;
a first polarizing plate on the upper substrate; and
a second polarizing plate below the lower substrate, the second polarizing plate comprising a passivation layer and a light diffusion layer,
wherein a thin layer is the only layer disposed between the passivation layer and the light diffusion layer; and
a backlight unit below the second polarizing plate,
wherein the thin layer is thinner than the passivation layer.

2. A liquid crystal display (LCD) device comprising:
lower and upper substrates facing each other;
a liquid crystal layer between the lower and upper substrates;
a first polarizing plate on the upper substrate;
a second polarizing plate below the lower substrate, the second polarizing plate comprising a first adhesive layer, a first passivation layer, a polarizer, a second passivation layer, a second adhesive layer, a $\lambda/4$ phase shift plate, a third adhesive layer, a Cholesteric Liquid Crystal (CLC) layer, a third passivation layer, and a light-diffusion layer having a plurality of projections on a surface thereof; and
a backlight unit below the second polarizing plate,
wherein the light-diffusion layer directly contacts the third passivation layer, wherein the light-diffusion layer produces an amount of Haze, and a density of the projections of the light-diffusion layer is less than a density of beads that would have to be added to the third adhesive layer to obtain the same amount of Haze.

3. The LCD device of claim 2, wherein the third adhesive layer is devoid of added beads.

4. The LCD device of claim 2, wherein the plurality of projections have round shapes.

5. The LCD device of claim 2, wherein the plurality of projections have smooth curves.

6. The LCD device of claim 2, wherein the backlight unit comprises a light-scattering means.

7. The LCD device of claim 6, wherein the light-scattering means comprises a light-diffusion plate, a first prism sheet above the light-diffusion plate, and a second prism sheet above the first prism sheet.

8. The LCD device of claim 2, wherein a total of Haze of the first polarizing plate and Haze of the second polarizing plate is at least about 40%.

9. The LCD device of claim 2, wherein the light-diffusion layer is adjacent to the backlight unit.

10. The LCD device of claim 9, wherein no additional layers are disposed between the light-diffusion layer and the backlight unit.

11. The LCD device of claim 2, wherein the projections contact the backlight unit.

12. The LCD device of claim 2, wherein the projections contacting the backlight unit have shapes that do not substantially damage the backlight unit.

* * * * *